United States Patent
De Roeck

(10) Patent No.: US 12,084,729 B2
(45) Date of Patent: Sep. 10, 2024

(54) METHOD OF MANUFACTURING DECORATED LEATHER

(71) Applicant: AGFA NV, Mortsel (BE)

(72) Inventor: Luc De Roeck, Mortsel (BE)

(73) Assignee: Agfa NV, Mortsel (BE)

( * ) Notice: Subject to any disclaimer, the term of this patent is extended or adjusted under 35 U.S.C. 154(b) by 650 days.

(21) Appl. No.: 17/284,298

(22) PCT Filed: Oct. 8, 2019

(86) PCT No.: PCT/EP2019/077208
§ 371 (c)(1),
(2) Date: Apr. 9, 2021

(87) PCT Pub. No.: WO2020/078774
PCT Pub. Date: Apr. 23, 2020

(65) Prior Publication Data
US 2021/0394543 A1 Dec. 23, 2021

(30) Foreign Application Priority Data
Oct. 17, 2018 (EP) ..................................... 18200858

(51) Int. Cl.
*C14B 1/56* (2006.01)
*B41M 5/00* (2006.01)
(Continued)

(52) U.S. Cl.
CPC .............. *C14B 1/56* (2013.01); *B41M 5/0047* (2013.01); *B41M 5/0076* (2013.01);
(Continued)

(58) Field of Classification Search
None
See application file for complete search history.

(56) References Cited

U.S. PATENT DOCUMENTS

| 2005/0206711 A1 | 9/2005 | Milini |
| 2016/0067984 A1 | 3/2016 | Chung |

FOREIGN PATENT DOCUMENTS

| GB | 2540011 A | 1/2017 |
| GB | 2510696 B | 4/2017 |

(Continued)

OTHER PUBLICATIONS

International Search Report dated Jan. 30, 2020 relating to PCT/EP2019/077208, 3 pages.

(Continued)

*Primary Examiner* — Katie L. Hammer
(74) *Attorney, Agent, or Firm* — Leydig, Voit & Mayer, Ltd.

(57) ABSTRACT

A manufacturing method of decorated natural leather including the steps of applying a crusted leather, having a corium side, a grain side and an edge, on a conveyor system, having a position means, and aligning said crusted leather by moving said edge against said position means; and laminating said aligned crusted leather on a temporary carrier, having an adhesive layer, wherein said corium side is attached by said adhesive layer on said temporary carrier while conveying said crusted leather on said conveyor system towards said temporary carrier and moving said temporary carrier relative to said conveyor system; and inkjet printing on said grain side with one or more pigmented inkjet inks an image by an inkjet printing system.

17 Claims, 3 Drawing Sheets

(51) Int. Cl.
*C09D 175/04* (2006.01)
*C09J 7/38* (2018.01)
*C14C 7/00* (2006.01)
*C14C 11/00* (2006.01)

(52) U.S. Cl.
CPC .............. *C09D 175/04* (2013.01); *C09J 7/38* (2018.01); *C14C 7/00* (2013.01); *C14C 11/006* (2013.01)

(56) References Cited

FOREIGN PATENT DOCUMENTS

| KR | 2017-0143170 | A1 | 12/2017 |
|----|--------------|----|---------|
| WO | 01/32434 | A1 | 5/2001 |
| WO | 2006/100055 | A1 | 9/2006 |
| WO | 2013/135828 | A1 | 9/2013 |
| WO | 2015/110953 | A1 | 7/2015 |

OTHER PUBLICATIONS

Written Opinion dated Jan. 30, 2020 relating to PCT/EP2019/077208, 5 pages.

METHOD OF MANUFACTURING DECORATED LEATHER

REFERENCE TO RELATED APPLICATIONS

This application is a 371 National Stage Application of PCT/EP2019/077208, filed Oct. 8, 2019, which claims the benefit of European Application No. 18200858.1, filed Oct. 17, 2018, the contents of which are incorporated by reference herein in their entirety.

TECHNICAL FIELD

The present invention relates to the manufacturing of decorated natural leather.

BACKGROUND ART

The manufacturing of natural leather articles is well known and can generally be split up in five phases as shown by FIG. 1. The preparatory phase 1 often occurs partly in a slaughterhouse and partly in a tannery, while phases 2 to 4 occur in the tannery and phase 5 occurs at a leather article manufacturer. In a first phase, the preparatory phase, the skin is removed from the animal (flaying) and pre-treated for the second phase of tanning. The pre-treatment may involve processes such as soaking, liming, unhairing, splitting and pickling (adjusting pH for assisting penetration of tanning agents). In the tanning phase, the protein of the rawhide or skin is converted into a stable material that will not putrefy. Chrome is most frequently used as tanning agent whereby the tanned product obtains a pale blue colour, therefore commonly called "wet blue". In the third phase of crusting, the tanned leather is dried and softened. The crusting often includes processes such as stripping (removal of superficially fixed tannins), fat liquoring (fats, oils and waxes are fixed to the leather fibres), dyeing, whitening, physical softening, and buffing (abrasion of leather surface to reduce grain defects). In the fourth phase, called the finishing phase, the leather is made ready for sale to leather article manufacturers. Finishing operations may include lacquer coating, polishing and embossing. In the fifth phase, a leather article is manufactured, involving processes, which may include cutting, perforating, sewing, leather wrapping, decoration and embossing.

Natural leather has been decorated in the past by screen printing. However, screen printing is labour intensive as for each colour an individual screen is required. This is costly and time consuming, especially when personalization or customization is desired.

Digital printing technologies on finished leather have been investigated but many solutions on finished leather remain of inferior quality. Inkjet technologies from textile printing employing heat transfer paper have been explored for leather printing. However just like inkjet printing directly onto natural leather, it was found that a process of inkjet printing dye-based images onto a sheet of transfer paper and then transferring the images onto tanned leather by heat resulted in a quality unacceptable for many luxury leather products. Examples of such inkjet processes are disclosed in WO 01/32434 A (GILHAM) and US 2016067984 A (CHUNG). Aspects such as image quality, light fading of transferred dyes and scratch resistance needed further improvement.

Light fading of dyes can be resolved by using pigmented inks. GB 2510696 (SERICOL) discloses a method of printing onto a leather or synthetic leather substrate by depositing a primer layer onto the substrate, the primer comprising a thermoplastic resin and water; at least partially drying and/or curing the primer; inkjet printing a pigmented hybrid solvent/radiation curable ink onto the primer layer; drying and curing the hybrid ink layer.

Recently high quality decorated leather has been obtained by a method of printing "into" tanned leather with pigmented inks. EP 2825387 A (CODUS) discloses a method of printing into tanned leather comprising the steps of a) applying ink acceptor directly to the surface of the leather; b) applying ink directly onto the acceptor by inkjet; c) applying an additive to the ink; d) heating a surface of a barrier which is substantially impervious to the ink; and e) contacting the heated barrier with the ink acceptor, additive and ink on the leather surface directly to soften the additive, ink acceptor and ink into the leather such that the ink penetrates into the leather.

Natural leather is cut into leather pieces, which may be further cut in smaller pieces and sewed together into leather articles. By inkjet printing on said leather pieces, leather articles can be personalized or can become a limited edition of said leather article by decorating with inkjet technology.

But applying all said leather pieces on a printing table from an inkjet printing table is labour-intensive work, which results in a long production timing wherein no ink is consumed. As known by the skilled person a long waiting time between printing are bad for inkjet printheads. This can be avoided by a regular maintenance of said inkjet printheads but this causes also an extension on said long production timing and ink consumption when maintaining said inkjet printheads. Such time delays and ink waste should be avoided so there is a need for obtaining a more efficient and economical method of manufacturing high quality decorated natural leather articles allowing personalization and having a short delivery time to the customer, as long delivery times reduce the luxury feel.

SUMMARY OF INVENTION

In order to overcome the problems described above, preferred embodiments of the present invention have been realised with a method for manufacturing decorating natural leather according to claim 1.

DESCRIPTION OF EMBODIMENTS

Manufacturing Methods of Decorated Natural Leather

Figure 1:
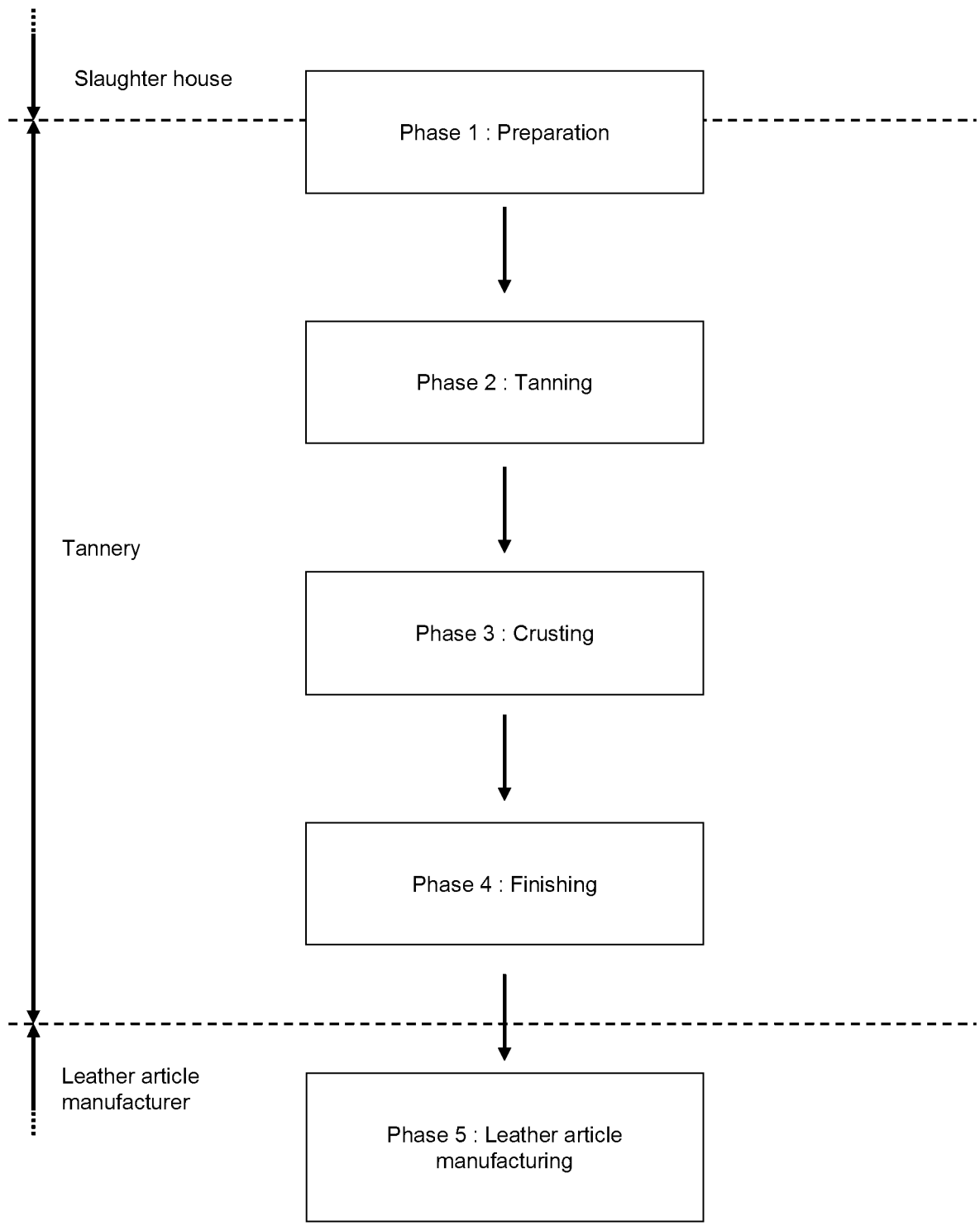
FIG. 1 shows a flow chart of the traditional manufacturing of leather articles involving the different phases and locations.

A manufacturing method of a decorated natural leather according to a preferred embodiment of the invention includes the steps of:
  applying a crusted leather, having a corium side, a grain side and an edge, on a conveyor system, having a position means, and aligning said crusted leather by moving said edge against said position means; and laminating said aligned crusted leather on a temporary carrier, having a top layer, wherein said corium side is attached by said top layer on said temporary carrier while conveying said crusted leather on said conveyor system towards said temporary carrier and moving said temporary carrier relative to said conveyor system; and inkjet printing on said grain side with one or more pigmented inkjet inks an image by an inkjet printing system. The top layer is preferably an adhesive layer for better attaching said corium side on said temporary carrier.

The present invention solves the possibilities to align one or more leather pieces on top of a temporary carrier, such as a sticky temporary carrier, which than can be easily printed in an aligned manner. The conveyor system is preferably a conveyor belt and more put on an angle so the alignment and moving against the position means is easier.

In a preferred embodiment of the manufacturing method, the crusted leather, the base coat, the decorative image and the top coat are heat pressed. Such a method is known from WO 2013/135828 A (CODUS) to make at least part of the sandwich "base coat/decorative inkjet image/top coat" penetrate and fuse into the leather.

In a preferred embodiment a plurality of crusted leathers are applied on said conveyor system for aligning said crusted leathers on said temporary carrier. Said conveyor system comprises therefore a set of position means for applying and aligning a set of crusted leathers. During said conveying-step and relative-moving-step said set of aligned crusted leathers are laminated on said temporary carrier for inkjet printing a set of images on said laminated set of aligned crusted leathers.

By applying said leathers in front on a conveyor system and then transferring them to the temporary carrier; the leathers are mounted and sticked in an aligned matter on the temporary carrier. If said alignment is determined, a set of images can be printed on the mounted leathers according said alignment; thus aligned on top of said mounted leathers. By the present invention a plurality of leathers can be printed aligned way, which is a tremendous time saving. The conveyor system may be a drum but its preferably a conveyor belt.

Said set of position means are preferably arranged in a lattice pattern so said set of leathers are arranged in the same pattern on the temporary carrier. The lattice patterns comprise preferably columns and/or rows so the set of leathers are arranged in columns and/or rows.

Preferably, the manufacturing comprises a step of flattening laminated crusted leather on said temporary carrier before said inkjet-printing-step by applying a pressure on said crusted leather. Said pressure may be applied by a pressure roller.

In a preferred embodiment extra position means may be added on said conveyor system or position means may be removed. The position means on said conveyor system are thus releasable wherein the positions depend on the shape of crusted leathers and/or determined distances between crusted leathers. So the said conveyor system may comprise a plurality of holding means for connecting said set of position means; and wherein the method may comprise the step of connecting said position means to said holding means; or disconnecting said position means from said holding means.

In a preferred embodiment said position means comprises, for aligning said crusted leather: a round pin, elongated pin, a beam or connected beams in a determined angle, which is preferably 90°. In another preferred embodiment said position means comprises an extension, which fits in a perforation, or cavity in said conveyor system for holding said position means. Shelf support pegs, used in cupboards, can be used.

In a preferred embodiment, locations of said set of connected position means are determined and transmitted to the inkjet printing system for inkjet printing said set of images according a layout, determined by said transmitted locations. In a preferred embodiment shape(s)/dimension(s) of applied leathers on said conveyor system are also transmitted to the inkjet printing system for inkjet printing said set of images according a layout determined by said transmitted locations and said shape(s)/dimension(s).

It is found for easy transferring a crusted leather from a conveyor belt as the conveyor system of the present invention towards the temporary carrier that at the output position of said conveyor system is a fixed knife-edge or a rolling knife-edge. The out position is the position where the crusted leather leaves the conveyor system.

A temporary carrier means that the carrier is present during a certain period of the manufacturing process. In the present invention is said temporary carrier used during inkjet printing. Said temporary carrier is separated from the laminated aligned crusted leather prior to assembling said leather into a leather article.

In a preferred embodiment of the manufacturing method, the temporary carrier is a paper foil or a plastic foil. The advantage of such a foil is that human transport of a decorated natural leather remains feasible due to the low weight contribution of the foil, especially when compared to a metallic, a wooden or a plastic plate as temporary carrier.

In one embodiment of the manufacturing method, the plastic foil is a transparent or translucent plastic foil. This allows for back-lighting the crusted leather attached to the plastic foil, so that the printable surface area and leather defects, such as bite marks and holes, are easily detected when scanning the temporary carrier with crusted leather attached thereto.

In a preferred embodiment of the manufacturing method, the temporary carrier foil is a paper foil or an opaque plastic foil, most preferably of a white colour.

In a preferred embodiment of the manufacturing method, the adhesive is applied by coating or spraying, preferably by spraying. This allows for fast applying the leather on the temporary carrier, thus resulting in higher productivity. The spraying is conducted on the surface of said temporary carrier.

In a preferred embodiment of the manufacturing method, the adhesive exhibits a higher cohesion with itself and a higher adhesion to the temporary carrier than the adhesion to the crusted leather. If this is the case, the adhesive can be faster removed from the corium side of the leather without causing any damage to leather.

In a preferred embodiment of the manufacturing method, a base coat is applied on the grain side of the crusted leather before the step of inkjet printing. It has been observed that such a base coat improves the image quality as leather contains irregularities and large concavities caused by remaining follicle mouths (pores of the skin) and wrinkles originally present in raw hide or skin. Upon inkjet printing, ink gathers in these irregularities and large concavities, thereby causing uneven colour densities. These irregularities and large concavities are smoothed out by applying a base coat consisting of one or more layers.

In a particularly preferred embodiment of the manufacturing method, the base coat includes a polymer or copolymer based on polyurethane. The presence of a polymer or copolymer based on polyurethane was beneficial for good flexibility. An enhanced compatibility between UV pigmented inkjet inks and the leather is observed.

In a particularly preferred embodiment of the manufacturing method, the base coat is also applied on the temporary carrier coated or sprayed with the adhesive. The advantage of this is that inkjet printed leather on a temporary carrier can be stapled without sticking problems, because the stickiness of the adhesive present on the temporary carrier not covered by leather is neutralized by the base coat.

In a preferred embodiment of the manufacturing method, the adhesive is a pressure sensitive adhesive. A pressure sensitive adhesive is an adhesive, which forms a bond between the leather and the temporary carrier when pressure is applied. No solvent, water, or heat is needed to activate the adhesive. Using a pressure sensitive adhesive results in an improved productivity. If the leather is not perfectly flat on the temporary carrier, part of the leather can be easily detached for re-attaching it in a flat manner. Such attachment and subsequent removal on an object without damaging the object is well-known from the Post-IT™ notes developed by 3M.

In a preferred embodiment of the manufacturing method, the one or more pigmented inkjet inks are one or more radiation curable pigmented inkjet ink, more preferably one or more UV curable pigmented inkjet inks. A high image quality can be obtained by using UV curable pigmented inkjet inks as UV curing can quickly "freeze" a decorative image after jetted ink drops landed on the leather or the base coat. More preferably a UV curable pigmented inkjet ink contains water or organic solvent in an amount of less than 25 wt %, more preferably less than 15 wt % and most preferably 0 to 10 wt % based on the total weight of the ink. If no or only a limited amount of water or organic solvent is present, then the penetration of the inkjet inks in pores of the crusted leather is restricted and enhanced image quality is obtained.

In a preferred embodiment of the manufacturing method, a top coat is applied onto the decorative image and the base coat. The top coat acts as a protective layer for the decorative image against, for example, scratches.

In a particularly preferred embodiment of the manufacturing method, the crusted leather, the base coat, the image and the top coat are heat pressed and/or embossed. Such a method of heat pressing is known from WO 2013/135828 A (CODUS) to make at least part of the sandwich "base coat/decorative inkjet image/top coat" penetrate and fuse into the leather.

Embossing is generally used to provide a leather with a design, for example, the grain structure of other animals may be copied to a certain leather. Usually, embossing is done on the grain side by compressing the leather grain structure. As the uncompressed leather fibres remain above, a three-dimensional effect is created.

Leather is sometimes ironed to smooth the leather or to make it shinier. Smooth leather is also less sensitive and easier to clean.

The decorative image is inkjet printed on the base coat using one or more pigmented inkjet inks. Contrary to most dyes, pigmented inkjet inks guarantee a good light fastness as the leather articles are often used in outdoor conditions. The one or more pigmented inkjet inks may be aqueous inkjet inks, but are preferably UV curable pigmented inkjet inks, because UV curing rapidly "freezes" the inkjet printed decorative image. The resulting good image quality contributes further to the luxury aspect of the decorated leather article.

A preferred embodiment is an assembly of a decorated natural leather attached by an adhesive to a temporary carrier as obtained by the manufacturing method as claimed in any one of claims 1 to 15.

Decorated Natural Leather and Leather Articles

Natural leather comes in different grades, such as full grain, top grain, which is essentially full-grain but with part of the grain layer sanded and the underlying split layer removed, and split leather. For the latter, the underlying layer of the hide is removed and used to create split leather. Depending on the thickness of the underlying layer, many splits can be created. Split leather has a rough appearance and is usually used to make suede.

For preventing grain damage and weakness, the hide or skin is tanned preferably by chrome, but other tanning methods such as vegetable tanning may also be used. After tanning, the leather is dried and softened into so-called crusted leather. The crusting may include processes such as stripping (removal of superficially fixed tannins), fat liquoring (fats, oils and waxes are fixed to the leather fibres), dyeing, whitening, physical softening, and buffing (abrasion of leather surface to reduce grain defects).

The decorated natural leather may be used for manufacturing a wide range of leather articles. Preferred leather articles include footwear, furniture, upholstery, bags and luggage, gloves, belts, wallets, clothing, automotive leather (e.g. train, plane, boat and car seats), interiors, books and stationary, packaging, equestrian articles and the like.

Adhesives

An adhesive may be used for attaching a crusted leather with its corium side to a temporary carrier. The top layer is then an adhesive layer. The adhesive is in the present invention applied to the temporary carrier before the mounting of leather from the conveyor belt whereon said leather is aligned in front.

Any adhesive known in the art can be used in the present invention, going from classical known adhesives to biomimic based adhesives.

Repositionable adhesives are preferred, as they facilitate the process for ensuring that the leather is attached completely flat on the carrier causing no collision with the inkjet print heads.

In the present invention, pressure sensitive adhesives are a particular preferred type of adhesives.

Temporary Carriers

There is no real limitation on the composition of the temporary carrier. Preferred temporary carriers for the present invention are polymeric, because of their light weight compared to e.g. metal temporary carriers. Synthetic polymers or natural polymers may be used for the temporary carrier.

Preferred natural polymers are cellulose based, such as plain paper or resin coated paper, e.g. polyethylene or polypropylene coated paper. Particularly preferred as temporary carrier is Kraft paper, as it is sufficiently strong and cheap.

Preferred synthetic polymers for the temporary carrier are polyethylene, polypropylene, polycarbonate, polyvinyl chloride, polyesters like polyethylene terephthalate (PET), polyethylene naphthalate (PEN) and polylactide (PLA) and polyimide. A foil of polyethylene terephthalate (PET) is a particularly preferred as temporary carrier because of its recyclability.

The temporary carrier may be transparent, translucent or opaque. Preferred opaque substrates includes so-called synthetic paper, like the Synaps™ grades of Agfa-Gevaert which are opaque polyethylene terephthalate foils having a density of 1.10 g/cm³ or more. Particularly preferred are Synaps™ OM135AP and Synaps™ OM135AR because they are pre-coated with an adhesive layer.

A white opaque temporary carrier has the advantage of providing a good contrast for the identifier, which generally has a black colour.

There is no restriction on the shape of the substrate. It can be a flat sheet, such a paper sheet or a polymeric sheet, or it can come in the form of a roll of paper or polymeric foils.

Another type of suitable material for the temporary carrier are textiles. A preferred textile is canvas, as it is an extremely durable plain-woven fabric that can be re-used multiple times.

The temporary carrier is preferably an air permeable support.

Air Permeable Support

The air-permeable support is in the present invention larger than the natural leather and preferably flat. Said natural leather covers partly said support to have good adherence at the edges of said natural leather. When said support is even sized than said natural leather and said leather is fully covering said support, an edge of said natural leather can crimp (wavy or curl) due to the tufted corium side and its adherence while applying the vacuum. This may result in a collision against a print head of the inkjet printer.

The air-permeable support comprises one or more fibrous layers wherein the corium side of the natural leather preferably is contact with a fibrous layer from said one or more fibrous layers. Said fibrous layer attaches easily to said fibrous and tufted corium side. Said fibrous layer may be coated and/or is an unwoven fabric such as felt. Said felt may be wool felt but preferably it is a polyester felt. Also recycled polyester felt may be used. Polyester felt are most preferred because said felts have a tighter construction and they can be used in operating temperature above 30° C. Polyester felt may be blended with other materials such as wool.

In the present invention the air-permeability of the air-permeable support may be at 200 Pa difference pressure between 30 and 120 L/(dm2×min) preferably between 35 and 90 L/(dm2×min). Said air-permeability can be measured with an AKUSTRON™ air permeability tester which follows industry standards DIN 53887, DIN 53120, ISO9237 and ASTM D 737-96. The air-permeability is thus measured in minutes, abbreviated as 'min'.

If the air-permeable support comprises a plurality of layers on top of each other, one or more of said layers is a fibrous layer but preferably all layers are fibrous. Said layers needs to be also air-permeable. The air-permeability of said air-permeable support is measured on all said multiple layers. Preferably a first layer from said plurality of layers in contact with the corium side is having a smaller air-permeability than a second layer, which is a subsequent layer of the first layer. Most preferably a subsequent layer of a layer of the plurality of layers has a higher air-permeability.

If the layer in contact with the corium side is an unwoven fabric, the orientation of the fibres of said unwoven fabric and said fibres which comes in contact with said corium side maybe adapted to have a better adherence with said fibrous and tufted corium side.

For easy handling and having a certain stiffness the air-permeable support the weight is preferably between 0.6 and 2.5 kg/m2. The thickness of said support is than preferably between 1.5 mm and 4 mm, more preferably between 1.5 mm and 3 mm. In a preferred embodiment is the thickness of the air-permeable support twice or more than the thickness of the supported natural leather but more preferably the thickness of the air-permeable support is not more than 100 times the thickness of the supported natural leather.

In a preferred embodiment is the air-permeable support a conveyor belt, wrapped around the vacuum support and plurality of pulleys or gliders. Said conveyor belt may be driven by an electric motor for producing a torque to one of said pulleys or conveyed when connected to a vacuum belt as vacuum support. Said last embodiment is highly preferred because the vacuum belt as vacuum support is arranged for printing correctly such as in register and with controlled speed. If the vacuum support is a vacuum table, the air-permeable support has to be stiff and have a low stretchability for printing in register and with controlled speed.

The conveying is preferably with successive distance movements, also called discrete step increments.

The air-permeable support may also be a sheet having one or more fibrous layers and wherein said support has an area larger than the natural leather.

When one or more natural leathers are supplied on the air-permeable support, the position may be scanned by a camera-system above said air-permeable support. If said support has a registration mark or registration means or an identification code said scanning can be used for optimizing the supply chain of the decorated natural leathers of the present invention. In post-processing of the decorated natural leather said identification code and positions of said one or more natural leathers can be used for example in cutting or heat-pressing or embossing or top-coating said natural leathers if they are still on said air-permeable support.

Conveyor Belt

The conveyor system in the present invention is preferably a conveyor belt. Preferably the conveyor belt has two or more layers of materials wherein an under layer provides linear strength and shape, also called the carcass and an upper layer called the cover or the support side. The carcass is preferably a woven fabric web and more preferably a woven fabric web of polyester, nylon, glass fabric or cotton. The material of the cover is preferably various rubber and more preferably plastic compounds and most preferably thermoplastic polymer resins. But also other exotic materials for the cover can be used such as silicone or gum rubber when traction is essential. The conveyor belt is preferably an air-permeable support, more preferably unwoven fabric, most preferably felt or polyester felt.

Preferably the conveyor belt comprises glass fabric or the carcass is glass fabric and more preferably the glass fabric, as carcass, has a coated layer on top comprising a thermoplastic polymer resin and most preferably the glass fabric has a coated layer on top comprising polyethylene terephthalate (PET), polyamide (PA), high-density polyethylene (HDPE), polytetrafluoroethylene (PTFE), polyoxymethylene (POM), polyurethaan (PU) and/or Polyaryletherketone (PAEK).

Preferably the conveyor belt is and endless conveyor belt.

Most conveyor belts are wrapping minimum two pulleys or wrapping a pulley and knife to form a conveyor belt system. A pulley in said conveyor belt system is preferably a drive drum for rotating said conveyor belt over its pulleys or knifes. In a preferred embodiment said conveyor belt system comprises at the output position a fixed knife-edge or a rolling knife-edge. The radius of said rolling knife edge is preferably between 2 and 20 mm to have a good transfer on the temporary carrier.

The conveyor belt preferable comprises a plurality of perforations and/or cavities for holding one or more position means. The position means has than an extension, which fits in said perforation or cavity. The plurality of perforations and/or cavities are preferably ordered on the carrying side in a lattice pattern for forming different alignment schemes depending on the size of the leathers to be applied on the conveyor belt and later aligned on the temporary carrier to be printed by inkjet technology.

Images

There is no real limitation on the type of image inkjet printed on the leather using one or more pigmented inkjet inks. The decorative may consist of a single colour or it may include multiple colours such as black, white, cyan, magenta, yellow, red, orange, violet, blue, green and brown.

A set of images may be printed according a layout. Said layout may be determined based on the locations of the used set of position means of the conveyor belt in the present invention. In a preferred embodiment said position means may be adapted, removed from or added to said conveyor belt so said layout is changeable. In a preferred embodiment, the layout is also additionally determined by the shape and/or size of the applied leathers on the conveyor belt. Said shape(s) and/or size(s) are therefore determined and also transmitted to the inkjet printing system.

Base Coats

The base coat applied on the crust leather provides a level of image quality commensurate to the luxury aspect of leather as the low viscosity of inkjet inks lets them penetrate rapidly into the leather resulting in a reduced image quality.

The base coat may be applied as a single layer, or may be applied as multiple layers. The multiple layers may even have a different composition for improving properties like adhesion or flexibility.

The base coat preferably includes a polymer or copolymer based on polyurethane, as this has been found to improve flexibility to the printed leather. The base coat preferably further includes a polyamide polymer or copolymer, as polyamide has been found to improve the compatibility with the crust leather and to improve the strength of the base coat.

The base coat is preferably applied by spraying, but may be applied by any coating technique known, such as knife coating, extrusion coating, slide hopper coating and curtain coating. It can be applied prior to attaching the crusted leather to temporary carrier or it may be applied when the crusted leather is already attached to the temporary carrier.

The base coat may be transparent, but is preferably an opaque base coat. The base coat may be a white base coat to enhance the colour vibrancy of the inkjet printed image, but preferably the base coat has a colour similar to that of the corium and the grain. Any desired colour may be chosen for the corium or grain and the base coat, such as red, green, brown, black, blue . . .

Pigmented Inkjet Inks

The one or more pigmented inkjet inks that are inkjet printed may be selected from aqueous pigmented inkjet inks, solvent based pigmented inkjet inks and radiation curable pigmented inkjet inks. However, the one or more pigmented inkjet inks are preferably one or more radiation curable inkjet ink, most preferably one or more UV curable inkjet inks.

The one or more pigmented inkjet inks preferably contain organic colour pigments as they allow for obtaining a high colour gamut on natural leather. Carbon black and titanium dioxide are inorganic pigments, which can be advantageously used in the present invention for composing black respectively white pigmented inkjet inks.

The preparation of pigmented UV curable inkjet inks is well-known to the skilled person. Preferred methods of preparation are disclosed in paragraphs [0076] to [0085] of WO 2011/069943 (AGFA).

Top Coats

A top coat may be applied onto the decorative image and the base coat for enhancing the scratch resistance of the decorative image.

The top coat may be applied as a single layer, or may be applied as multiple layers. The multiple layers may even have a different composition for improving properties like scratch resistance.

The protective top coat may have the same or a similar composition as the base coat. Usually the protective top coat is somewhat optimized according to the leather application. For example, flexibility does not play an important role for a leather book cover contrary to leather shoes. Hence, the protective top coat for a book cover may be optimized towards scratch resistance.

The top coat preferably includes a cross-linker and a polymer or copolymer based on polyurethane and/or polyamide.

The top coat preferably includes a polymer or copolymer based on polyurethane as this is beneficial for the flexibility of the printed leather. A polyamide polymer, which is found to have a high compatibility with a polyurethane binder, is preferably included if the scratch resistance needs to be improved.

The top coat is preferably applied by spraying, but may be applied by the same coating techniques as mentioned above for the base coat.

The top coat is most preferably a transparent top coat, but may be a translucent top coat. By having a transparent top coat, the inkjet printed image is clearly visible through the top coat. By using a translucent top coat, a special aesthetic effect is created.

If a matt top surface is desired for the inkjet printed leather, a matting agent may be included. Any suitable matting may be used. Preferred matting agent include silica.

Inkjet Printing System

The one or more pigmented inkjet ink are jetted by one or more print heads ejecting small droplets in a controlled manner through nozzles onto natural leather moving relative to the print head(s).

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with inkjet ink or liquid. When the voltage is again removed, the ceramic expands to its original shape, ejecting a drop of ink from the print head.

A preferred piezoelectric print head is a so-called through-flow piezoelectric drop-on-demand print head. By using through-flow print heads, the reliability is enhanced and thus a more efficient and economical method of manufacturing high quality decorated natural leather articles is obtained. Such a print head is, for example, available at TOSHIBA TEC as the CF1ou print head.

However, the inkjet printing method according to the present invention is not restricted to piezoelectric inkjet printing. Other inkjet print heads can be used and include various types, such as a continuous type print head.

The inkjet print head normally scans back and forth in a transversal direction across the moving leather surface, known as a multi-pass printing mode. Sometimes the inkjet print head does not print on the way back. Bi-directional printing is preferred for obtaining a high areal throughput.

Another preferred printing method is by a "single pass printing process", which can be performed by using page wide inkjet print heads or multiple staggered inkjet print heads that cover the entire width of the leather surface. In a single pass printing process, the inkjet print heads usually remain stationary and the ink-receiving leather surface is transported under the inkjet print heads.

An advantage of using a multi-pass printing mode is that the liquid UV curable inkjet ink is cured in a consecutive passes, rather than in a single pass that would require a curing device with a high UV output. The print head lifetime is also larger for multi pass printing. While in single pass printing one side shooter is sufficient to replace the whole print head, in multi pass printing side shooters and even failings can be tolerated. Also the cost of a multi-pass printer is usually much lower, especially for large format crusted leather.

Curing Devices

If aqueous or solvent based pigmented inkjet inks are used, then some curing device for evaporation of water and organic solvents is required. Suitable curing means include a heat radiation means like a hot air dryer, an oven, or an infrared light source, such as an infrared laser, one or more infrared laser diodes or infrared LEDs.

If UV curable pigmented inkjet inks are used, then curing is usually performed by ultraviolet radiation alone. If so-called hybrid UV curable pigmented inkjet inks containing also water or organic solvents, then the curing device preferably further also includes curing means used for aqueous or solvent based pigmented inkjet inks.

In inkjet printing, the curing device may be arranged in combination with the print head of the inkjet printer, travelling therewith so that the inkjet ink is exposed to curing radiation very shortly after been jetted.

Any ultraviolet light source, as long as part of the emitted light can be absorbed by the photo-initiator or photo-initiator system, may be employed as a radiation source, such as, a high or low pressure mercury lamp, a cold cathode tube, a black light, an ultraviolet LED, an ultraviolet laser, and a flash light.

EXAMPLES

The figures from 2 to 4 illustrates some preferred embodiments of the present invention. The crusted leather (700) are applied on a conveyor belt (100) against position means (105). By conveying (showed as arced arrow in the pulley) and moving a temporary carrier (200), comprising a adhesive layer (205) as top layer, the aligned crusted leather is laminated on said temporary carrier (200) in an aligned way. The laminated and aligned crusted leather is than flattened by a flattener (300) to prevent printhead collisions while printing with the inkjet printhead (400). The inkjet printed image is than cured by the curing device (500).

Figure 2:
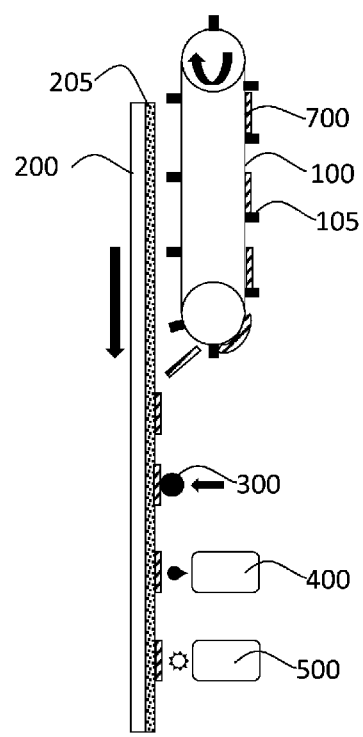
FIG. 2 shows a cross-section of manufacturing line according a preferred embodiment of the present invention.
Figure 3:
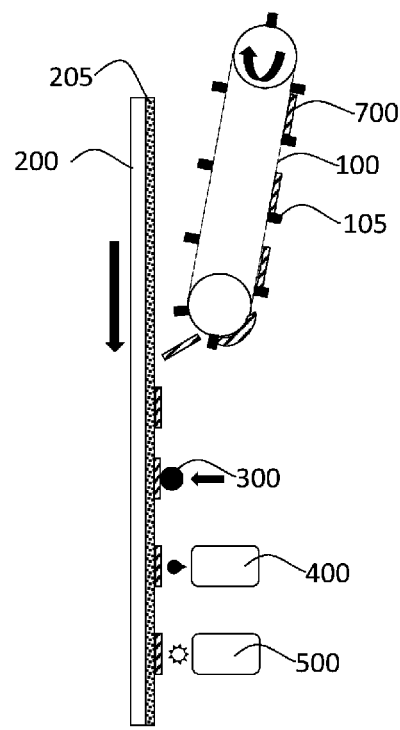
FIG. 3 shows a cross-section of manufacturing line according a preferred embodiment of the present invention.
Figure 4:
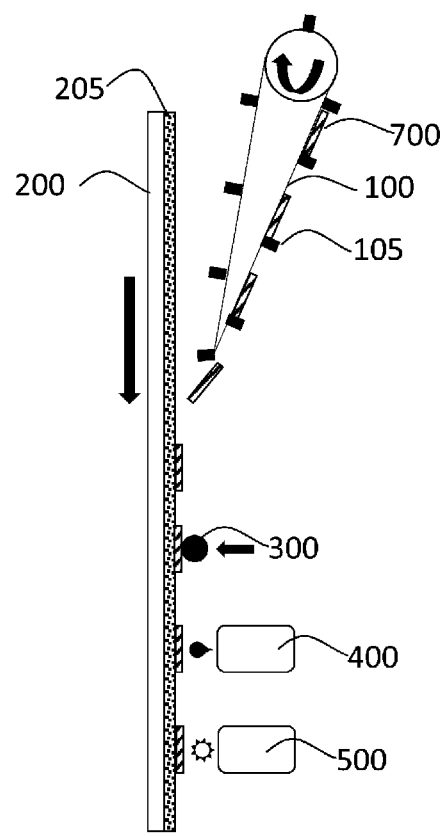
FIG. 4 shows a cross-section of manufacturing line according a preferred embodiment of the present invention.

FIG. 2 shows a horizontal positioned conveyor belt. FIG. 3 shows a slanted conveyor belt (put on an angle). FIG. 4 shows a specific conveyor belt system wherein at the output position a fixed knife-edge is shown.

REFERENCE SIGNS LIST

100 conveyor belt
105 position means
200 temporary carrier
205 adhesive layer
300 flattener
400 inkjet printhead
500 curing device
700 crusted leather

The invention claimed is:

1. A method of manufacturing decorated natural leather comprising:
   applying a crusted leather comprising a corium side, a grain side, and an edge onto a conveyor system comprising a positioning means;
   aligning the crusted leather by moving the edge against the positioning means;
   conveying the crusted leather by the conveyor system towards a temporary carrier comprising a top layer;
   laminating the crusted leather on the temporary carrier such that the corium side is attached to the top layer;
   inkjet printing an image on the grain side with one or more pigmented inkjet inks using an inkjet printing system.

2. The method of claim 1, wherein:
   the conveyor system comprises a set of positioning means for applying and aligning a set of crusted leathers; and
   the method further comprises:
      laminating the set of crusted leathers on the temporary carrier; and
      inkjet printing a set of images on the set of crusted leathers.

3. The method of claim 2, further comprising flattening the crusted leather on the temporary carrier by applying a pressure on the crusted leather after laminating the crusted leather and before inkjet printing the image.

4. The method of claim 3, wherein:
   the conveyor system comprises a plurality of holding means for connecting the set of positioning means; and
   the method further comprises connecting the positioning means to a holding means of the plurality of holding means.

5. The method of claim 4, further comprising:
transmitting locations of the set of positioning means to the inkjet printing system after connecting the positioning means to the holding means;
determining a layout for inkjet printing the set of images from the locations; and
inkjet printing the images according to the layout.

6. The method of claim 5, wherein the holding means is a perforation or cavity in the conveyor system and the positioning means comprises an extension which fits in the perforation or cavity.

7. The method of claim 6, wherein the positioning means further comprises: a round pin, an elongated pin, a beam, or connected beams for aligning the crusted leather.

8. The method of claim 1, wherein the conveyor system is a conveyor belt.

9. The method of claim 1, wherein the conveyor system comprises an output position comprising a fixed knife-edge or a rolling knife-edge.

10. The method of claim 2, wherein the conveyor system is a conveyor belt.

11. The method of claim 2, wherein the conveyor system comprises an output position comprising a fixed knife-edge or a rolling knife-edge.

12. The method of claim 1, wherein the temporary carrier is a paper foil, a plastic foil, or polyester felt.

13. The method of claim 12, wherein the top layer is an adhesive layer.

14. The method of claim 13, wherein the adhesive layer comprises a pressure sensitive adhesive.

15. The method of claim 2, wherein the temporary carrier is a paper foil, a plastic foil, or polyester felt.

16. The method of claim 15, wherein the top layer is an adhesive layer.

17. The method of claim 16, wherein the adhesive layer comprises a pressure sensitive adhesive.

* * * * *